(12) United States Patent
Van Wyk (10) Patent No.: US 9,391,914 B2
(45) Date of Patent: Jul. 12, 2016

(54) COMMUNICATION PACKET CONVERSION (71) Applicant: Itron, Inc., Liberty Lake, WA (US)

(72) Inventor: Hartman Van Wyk, Montlouis sur Loire (FR)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 14/550,612

(22) Filed: Nov. 21, 2014

(65) Prior Publication Data

US 2015/0078256 A1 Mar. 19, 2015

Related U.S. Application Data

(63) Continuation of application No. 13/450,243, filed on Apr. 18, 2012, now Pat. No. 8,902,901, which is a continuation of application No. PCT/US2012/030860, filed on Mar. 28, 2012.

(30) Foreign Application Priority Data

Mar. 23, 2012 (EP) .................................... 12161054

(51) Int. Cl.
*H04L 12/805* (2013.01)
*H04W 28/06* (2009.01)
*H04L 12/841* (2013.01)
(Continued)

(52) U.S. Cl.
CPC .............. *H04L 47/365* (2013.01); *H04L 47/28* (2013.01); *H04W 28/065* (2013.01); *H04W 28/02* (2013.01)

(58) Field of Classification Search
CPC ..... H04L 47/365; H04L 47/28; H04W 28/02; H04W 28/065

USPC ......................................................... 370/393
See application file for complete search history.

(56) References Cited

U.S. PATENT DOCUMENTS 6,300,881 B1 * 10/2001 Yee et al. ................. 340/870.02
6,400,723 B1    6/2002 Burg et al.
7,170,893 B2 *  1/2007 Rajan et al. .................... 370/393
(Continued)

FOREIGN PATENT DOCUMENTS

EP          1750202      2/2007
WO        WO9921331      4/1999

OTHER PUBLICATIONS

The European Office Action mailed Apr. 13, 2015 for European patent application No. 12161054.7, a counterpart foreign application of U.S. Pat. No. 8,902,901, 4 pages.
(Continued)

*Primary Examiner* — Guang Li
*Assistant Examiner* — Faisal Choudhury (57) ABSTRACT

Techniques for converting communication packets in a network having multiple nodes are described herein. A node may receive communication packets from one or more neighboring nodes. Each communication packet may include control data and payload data. The node may extract the payload data and store the payload data for a time period. The node may determine whether to concatenate the extracted payload data of the communication packets (e.g., based on destinations to where each of the extracted payload data are to be sent, a supported data rate, an application type associated with the extracted payload data, etc.). The node may concatenate the extracted payload data of the communication packets and send the concatenated payload data to another node in a communication packet.

18 Claims, 6 Drawing Sheets

(51) Int. Cl.
*H04L 12/28* (2006.01)
*H04W 28/02* (2009.01)

(56) References Cited

U.S. PATENT DOCUMENTS

| | | | |
|---|---|---|---|
| 7,280,562 B2 | 10/2007 | Sindhushayana et al. | |
| 7,400,264 B2* | 7/2008 | Boaz | G01D 4/004 340/870.01 |
| 7,474,642 B1 | 1/2009 | Chheda | |
| 7,580,755 B1 | 8/2009 | Schwartz et al. | |
| 7,583,197 B2 | 9/2009 | Wesby Van Swaay | |
| 8,094,010 B2 | 1/2012 | Wesby-van Swaay | |
| 2002/0030604 A1* | 3/2002 | Chance | H04Q 9/00 340/870.09 |
| 2004/0268206 A1* | 12/2004 | Kim | H04L 1/0003 714/758 |
| 2005/0059383 A1* | 3/2005 | Williamson et al. | 455/414.1 |
| 2005/0191054 A1 | 9/2005 | Aoki et al. | |
| 2006/0285551 A1 | 12/2006 | Barker et al. | |
| 2007/0073895 A1 | 3/2007 | Sebire et al. | |
| 2007/0076723 A1 | 4/2007 | Chen | |
| 2007/0091810 A1 | 4/2007 | Kim et al. | |
| 2007/0195868 A1 | 8/2007 | Walker et al. | |
| 2007/0223472 A1 | 9/2007 | Tachibana et al. | |
| 2008/0049620 A1 | 2/2008 | Riga et al. | |
| 2008/0080410 A1 | 4/2008 | Tian et al. | |
| 2008/0089390 A1 | 4/2008 | Picard | |
| 2008/0130616 A1 | 6/2008 | Wengerter et al. | |
| 2008/0187001 A1* | 8/2008 | Vaswani | G01D 4/004 370/466 |
| 2008/0279219 A1* | 11/2008 | Wu et al. | 370/474 |
| 2008/0282125 A1 | 11/2008 | Hafeez et al. | |
| 2009/0290580 A1 | 11/2009 | Wood et al. | |
| 2009/0296738 A1 | 12/2009 | Shimada | |
| 2010/0183032 A1 | 7/2010 | Michalewicz et al. | |
| 2010/0189105 A1 | 7/2010 | Wentink | |
| 2010/0220661 A1 | 9/2010 | Mishra et al. | |
| 2011/0194487 A1* | 8/2011 | Namburi | H04L 47/14 370/328 |
| 2011/0194854 A1 | 8/2011 | Freire et al. | |
| 2011/0199946 A1 | 8/2011 | Breit et al. | |

OTHER PUBLICATIONS

The Extended European Search Report mailed Nov. 9, 2012 for European patent application No. 12161054.7, 6 pages.
Freaklabs—Open Source Wireless, IEEE 802.15.4 in the context of Zigbee—Part 2, Dec. 14, 2008, 8 pages.
Office action for U.S. Appl. No. 13/450,243, mailed on Jan. 30, 2014, Van Wyk, "Communication Packet Conversion", 21 pages.
Office action for U.S. Appl. No. 13/450,243, mailed on Apr. 22, 2014, Van Wyk, "Communication Packet Conversion", 23 pages.
Office action for U.S. Appl. No. 13/450,243, mailed on Sep. 10, 2013, Van Wyk, "Communication Packet Conversion", 17 pages.
The PCT Search Report mailed Dec. 27, 2012 for PCT application No. PCT/US12/30860, 10 pages.
Wireless Medium Access Control, IEEE 802.15.4, Speaker Chun-Yi Chen, Sep. 7, 2007, 40 pages.
The Australian Office Action mailed Jul. 24, 2015 for Australian patent applicatoin No. 2012374019, a counterpart foreign application of U.S. Pat. No. 8,902,901, 3 pages.
Japanese Office Action mailed Jan. 19, 2016, with English translation, for Japanese Patent Application No. 2015-501645, 8 pages.
Australian Notice of Acceptance mailed Nov. 25, 2015, for Australian Patent Application No. 2012374019, 2 pages.

* cited by examiner

COMMUNICATION PACKET CONVERSION

CROSS REFERENCE TO RELATED APPLICATIONS

This application is a continuation of, U.S. application Ser. No. 13/450,243 filed Apr. 18, 2012, which is a continuation of, PCT International Application No. PCT/US12/30860, filed Mar. 28, 2012, which claims foreign priority to European Application No. 12161054.7, filed Mar. 23, 2012, all of which are incorporated herein by reference.

BACKGROUND

Communication networks, such as wireless mesh networks, are used to connect a variety of different devices (e.g., nodes). These communication networks often contain multiple different generations of nodes having different characteristics and capabilities. For example, nodes may utilize different data rates and/or modulation techniques to send and/or receive data over the network. Further, these communication networks may experience different interference and/or network throughput characteristics. This often results in fragmented and/or different sized data packets and/or congestion on the network. Due to relatively fixed amounts of overhead associated with each communication, these fragmented or different sized data packets may require substantial communication time as the data packets are transferred through the network. This communication time may be lengthened when a data packet traverses multiple nodes in order to reach a destination.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As discussed above, existing techniques for transmitting data do not provide an effective way of transmitting data within a wireless mesh network. For example, existing transmission techniques are not well suited to transmit data in a heterogeneous wireless mesh network in which nodes have differing capabilities. Further, existing transmission techniques are not well suited in a wireless mesh network that experiences different interference and/or network throughput characteristics (e.g., congestion).

This disclosure describes techniques of transmitting data in an efficient manner in a network of nodes. In particular, techniques are directed to converting communication packets as data within the communication packets traverses nodes of the network.

In some implementations, a particular node may receive communication packets over a wireless connection on a network. The communication packets may be received from one or more neighboring nodes, such as nodes that are located within a predetermined distance to the particular node. A communication packet may include control data and payload data. As used herein, the term "payload data" may generally refer to data that is intended to be transmitted and/or received. Meanwhile, the term "control data" may generally refer to data associated with the payload data for the purpose of routing, sending (e.g., transmitting), receiving, and/or storing the payload data, such as headers, footers, preambles, etc.

The particular node that received the communication packets may extract payload data from each of the communication packets. The particular node may determine whether to concatenate the extracted payload data. That is, the particular node may determine whether to combine extracted payload data from a first communication packet with extracted payload data from a second communication packet.

For example, the particular node may determine to concatenate the extracted payloads when the extracted payloads are to be sent to a same node or nodes within a particular geographical region. Alternatively, or additionally, the particular node may determine to concatenate the extracted payloads when a data rate supported by the particular node and a neighboring node to which the payload data will be sent is greater than a data rate supported by the particular node and a node that sent one of the communication packets. Further, in some instances the particular node may determine to concatenate the extracted payloads when the payloads are associated with a same or similar application or application type, such as an application that generated the payload data (e.g., an application for reporting meter consumption data).

When the particular node determines to concatenate the extracted payload data, the particular node may concatenate the extracted payload data and send (e.g., transmit) the concatenated payload data to another node. The concatenated payload data may be sent in a communication packet. In some instances, the concatenated payload data may be sent to a node that is closer to a destination node than the particular node. In some examples, the concatenated payload data may be sent at a higher data rate than a data rate at which at least one of the communication packets was received at the particular node.

In some instances, concatenated payload data is segmented at a node before it is sent to another node. The concatenated payload data may be segmented based on a data rate and/or a modulation technique supported by a node that will send the payload data and/or a node that will receive the payload data. For example, when a data rate supported by sending and receiving nodes is greater than or equal to a predetermined data rate, concatenated data may be segmented into segments that each has more than a predetermined number of bits and/or bytes. The segments may be sent individually to the receiving node in communication packets.

In some examples, the techniques described herein may be leveraged for encrypted data (e.g., payload data). For instance, when encrypted data needs to traverse a network of nodes, a communication packet may be used with unencrypted control data and encrypted payload data. Here, the node may use the unencrypted control data to potentially combine the encrypted payload data and forward on combined payload data to another node. For instance, the node may use routing information (e.g., source and/or destination addresses) included in the control data to determine whether the encrypted payload data is destined for a same node as other payload data. As such, in some examples where encrypted payload data is used, the encrypted payload data may be combined and forwarded on to another node, even when the node is unable, or does not wish, to decrypt the payload data and retrieve the underlying data.

The conversion techniques are described herein in the context of a utility mesh network including a plurality of nodes. While the techniques are described in the context of a utility mesh network, the techniques may additionally, or alternatively, be applicable to other networks and/or other applications. As such, the nodes may include any device coupled to a communication network and capable of sending and/or receiving data.

In various embodiments described herein, data may be transmitted in an efficient manner. For example, by combining (e.g., concatenating) payload data from multiple communication packets, data may be sent over a network with less overhead (e.g., control data) in comparison to transmitting the payloads individually in communication packets. This may reduce communication time for transmitting data over the network and increase communication capacity of the network.

In addition, in some instances by combining and/or segmenting payload data based on a modulation technique and/or data rate supported by nodes of a network, capabilities of the nodes may be leveraged to achieve one or more desired characteristics. For example, capabilities of nodes may be leveraged to transmit payload data at a particular data rate and/or with a particular modulation technique that is optimal for avoiding interference, transferring data over long or short distances, and/or increasing network throughput. In one example, a node may transmit combined payload data at a data rate that is greater than or less than a data rate at which the node received some or all of the individual payload data. In another example, a node may transmit segmented payload data to ensure that the data is transferred to a node associated with particular characteristics, such as a long connectivity distance, strong interference, etc.

The sections below are examples provided for the reader's convenience and are not intended to limit the scope of the claims, nor the proceeding sections. Furthermore, the techniques described in detail below may be implemented in a number of ways and in a number of contexts. One example implementation and context is provided with reference to the following figures, as described below in more detail. Additionally, the following implementation and context is meant to be representative of other possible implementations.

Example Architecture

Figure 1:
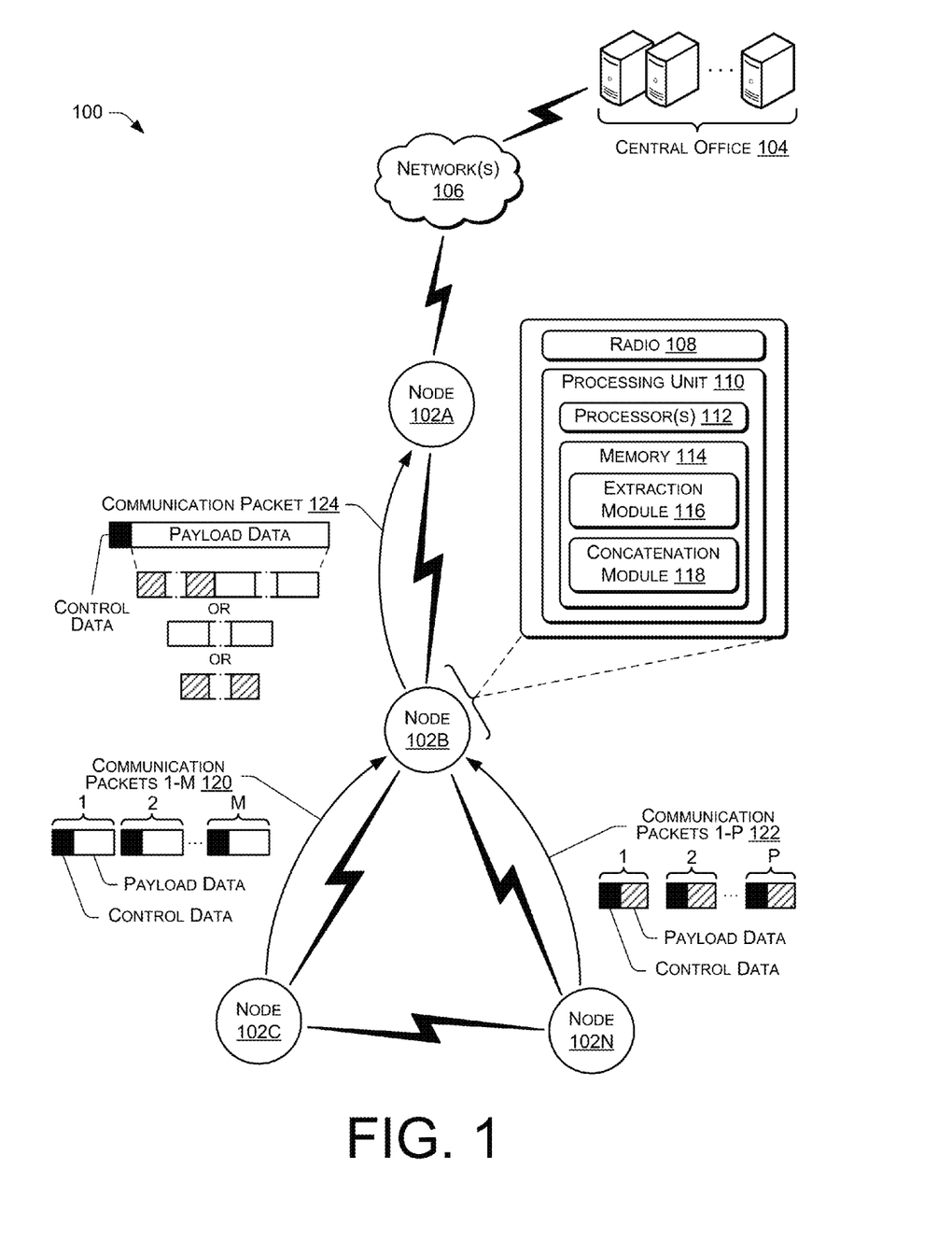
FIG. 1 illustrates an example architecture to convert communication packets as data within the communication packets traverses one or more nodes of a network.

FIG. 1 is a schematic diagram of an example architecture 100 of a wireless mesh network in which the techniques described herein may be implemented. The architecture 100 includes a plurality of nodes 102A, 102B, 102C, . . . 102N (collectively referred to as nodes 102) communicatively coupled to each other via direct communication paths (e.g., wireless connections). In this example, N represents a number of nodes in an autonomous routing area (ARA), such as a wide area network (WAN), metropolitan area network (MAN), local area network (LAN), neighborhood area network (NAN), personal area network (PAN), or the like.

Each direct communication path may represent a plurality of channels over which a node is able to transmit and/or receive data. Each of the plurality of channels may be defined by a frequency range which may be the same as or different from frequency ranges of others of the plurality of channels. In some instances, the plurality of channels comprises radio frequency (RF) channels. The plurality of channels may comprise a control channel and multiple data channels. In some instances, the control channel is utilized for communicating one or more messages between nodes to specify one of the data channels to be utilized to transfer data. Generally, transmissions on the control channel are shorter relative to transmissions on the data channels.

Each of the nodes 102 may be implemented as any of a variety of conventional computing devices such as, for example, smart utility meters (e.g., electric, gas, and/or water meters), control devices, sensors (e.g., temperature sensors, weather stations, frequency sensors, etc.), transformers, routers, servers, relays (e.g., cellular relays), switches, valves, combinations of the foregoing, or any device couplable to a communication network and capable of sending and/or receiving data. In some cases, the nodes 102 may include different types of nodes (e.g., smart meters, cellular relays, sensors, etc.), different generations or models of nodes, and/or nodes that otherwise are capable of transmitting on different channels and using different modulation techniques, data rates, protocols, signal strengths, and/or power levels. In these cases, the architecture 100 may represent a heterogeneous network of nodes.

In the example of FIG. 1, the nodes 102 are also configured to communicate with a central office 104 via an edge device (e.g., cellular relay, cellular router, edge router, DODAG root, etc.) which serves as a connection point of the ARA to a backhaul network(s) 106, such as the Internet. In the example illustrated, the node 102A serves as a cellular relay to relay communications from the other nodes 102B-102N of the ARA to and from the central office 104 via the network(s) 106.

The node 102B is representative of each of the nodes 102 in the example 100 and includes a radio 108 and a processing unit 110. The radio 108 comprises an RF transceiver configured to transmit and/or receive RF signals via one or more of a plurality of channels/frequencies. In some implementations, each of the nodes 102 includes a single radio 108 configured to send and receive data on multiple different channels, such as the control channel and multiple data channels of each communication path. The radio 108 may also be configured to communicate using a plurality of different modulation techniques, data rates, protocols, signal strengths, and/or power levels.

The processing unit 110 may include one or more processor(s) 112 communicatively coupled to memory 114. The memory 114 may be configured to store one or more software and/or firmware modules, which are executable on the processor(s) 112 to implement various functions. While the modules are described herein as being software and/or firmware executable on a processor, in other embodiments, any or all of the modules may be implemented in whole or in part by hardware (e.g., as an ASIC, a specialized processing unit, etc.) to execute the described functions.

In the embodiment of FIG. 1, the memory 114 includes an extraction module 116 and a concatenation module 118. The extraction module 116 is configured to extract data from communication packets received at the node 102B. For example, the extraction module 116 may extract payload data from communication packets 1-M 120 that are received from the node 102C and/or extract payload data from communication packets 1-P 122 that are received from the node 102N.

A communication packet may generally refer to a packet that is transmitted between the nodes 102. A communication packet may be transmitted to a particular node or transmitted to multiple nodes, such as in the case of broadcasting. While the techniques are described herein in the context of packets, these techniques may similarly apply to other types of protocol data units (PDUs), such as bits, frames, segments, etc.

As noted above, a communication packet may include payload data and control data. Payload data may generally refer to data that is intended to be sent (e.g., transmitted), received, and/or stored. This data is included in the "payload" of a transmission. In some instances, payload data includes data that is generated at a node and/or data that is to be sent and/or received at a node. Further, in some instances the term "payload" is defined by a standard, such as the IEEE 802.11 or 802.15 standard.

The control data may refer to data associated with payload data for the purpose of routing, sending (e.g., transmitting), receiving, and/or storing the payload data. In some instances, control data refers to non-payload data (e.g., data that is not the payload data). Control data may include headers, footers, preambles, and/or metadata, for example. In some instances, the control data includes modulation and data rate information, error detection and correction information, encryption information, and so on. Further, in some instances the control data includes address information, such as an address of a source node from which a communication packet was sent, a destination node to which payload data is to be sent, a PAN coordinator of the network, or the like. In some examples, control data is defined through a standard, such as the IEEE 802.11 or 802.15 standard. For instance, control data may refer to headers that are defined in the IEEE 802.15 standard.

By way of example and not limitation, in a utility mesh network where nodes are associated with utility meters (e.g., electric, gas, water, etc.), meter consumption data may be generated at a source node, such as a water reading. In this example, the meter consumption data may be reported to a central office by traversing nodes of the network. That is, the meter consumption data may be sent from one node to the next in order to arrive at the central office. While traversing the network, other data may be transmitted along with the meter consumption data. For example, the source node may transmit the meter consumption data with an address of the central office. Here, the meter consumption data represents payload data and the address of the central office represents control data.

Meanwhile, the concatenation module 118 is configured to determine whether to concatenate (e.g., combine) data extracted by the extraction module 116. The determination whether to concatenate may be based on various factors, such as a destination to where extracted payload data is to be sent, a data rate supported by the node 102B and/or a neighboring node to which the concatenated payload data will be sent, and/or an application or application type associated with extracted payload data. When it is determined to concatenate extracted payload data, the concatenation module 118 may concatenate the extracted payload data.

For instance, the concatenation module 118 may determine that first payload data extracted from one of the communication packets 1-P 122 is to be sent to a same node as second payload data extracted from one of the communication packets 1-M 120. Based on this determination, the concatenation module 118 may concatenate the first payload data with the second payload data. The concatenated payload data may be transmitted from the node 102B to a neighboring node in a communication packet 124.

The memory 114 in which the extraction module 116 and concatenation module 118 are stored may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The network(s) 106 represents a backhaul network, which may itself comprise a wireless or wired network, or a combination thereof. The network(s) 106 may be a collection of individual networks interconnected with each other and functioning as a single large network (e.g., the Internet or an intranet). Further, the individual networks may be wireless or wired networks, or a combination thereof.

The central office 104 may be implemented by one or more computing devices, such as servers, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, sensor, control device, router, regulator, server, relay, switch, valve, and/or other nodes. Although the example of FIG. 1 illustrates the central office 104 in a single location, in some examples the central office 104 may be distributed amongst multiple locations and/or may be eliminated entirely (e.g., in the case of a highly decentralized distributed computing platform).

Example Node

Figure 2:
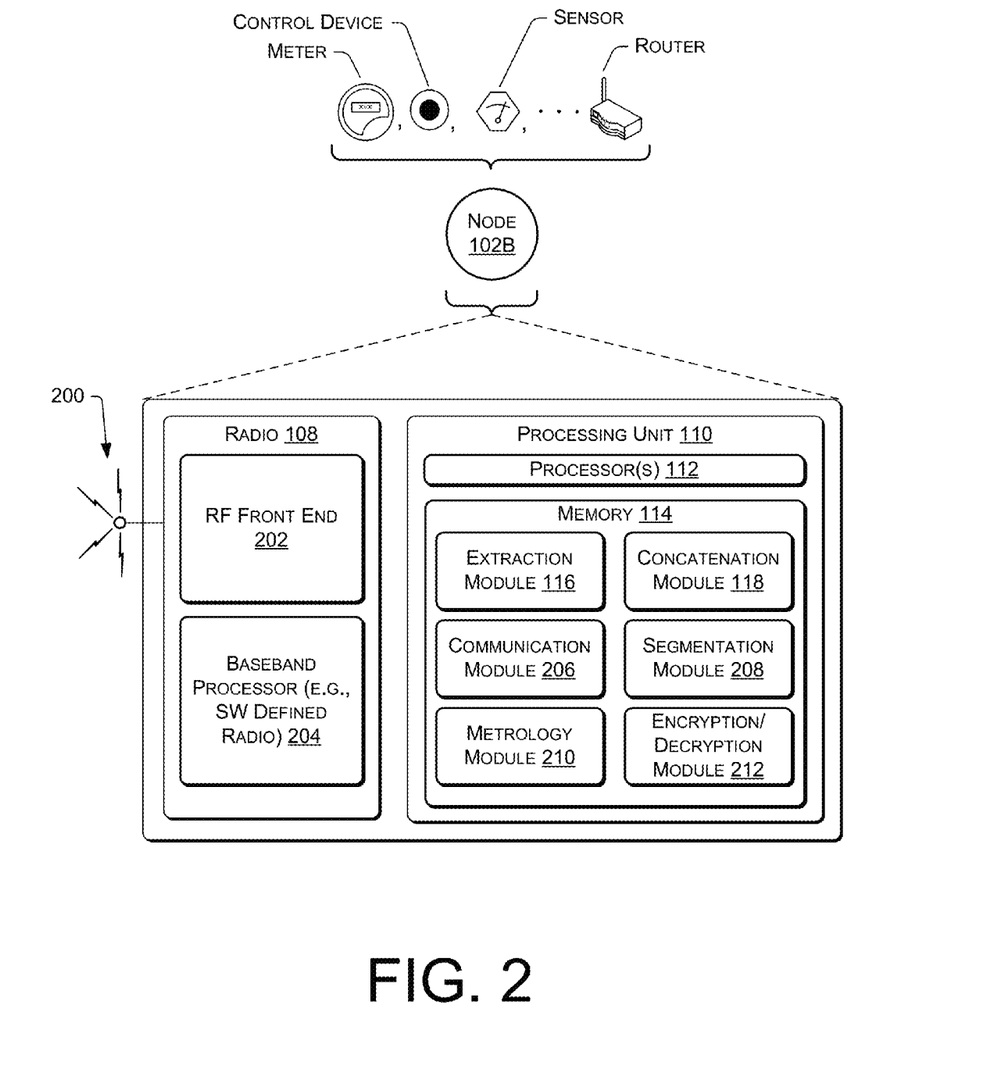
FIG. 2 illustrates additional details of an example node of the architecture of FIG. 1.

FIG. 2 is a schematic diagram showing additional details of example node 102B in FIG. 1. In this example, the radio 108 includes an antenna 200 coupled to an RF front end 202 and a baseband processor 204. The RF front end 202 may provide transmitting and/or receiving functions. The RF front end 202 may include high-frequency analog and/or hardware components that provide functionality, such as tuning and/or attenuating signals provided by the antenna and obtained from one or more of the nodes 102. The RF front end 202 may provide a signal to the baseband processor 204.

In one example, all or part of the baseband processor 204 may be configured as a software (SW) defined radio. In one example, the baseband processor 204 provides frequency and/or channel selection functionality to the radio 108. For example, the SW defined radio may include mixers, filters, amplifiers, modulators and/or demodulators, detectors, etc., implemented in software executed by a processor or application specific integrated circuit (ASIC) or other embedded computing device(s). The SW defined radio may utilize the processor(s) 112 and software defined and/or stored in memory 114. Alternatively, the radio 108 may be implemented at least in part using analog components.

In some implementations, the radio 108 utilizes a modulation technique and/or data rate associated with a previously defined standard. The modulation technique and/or data rate may be associated with a standard defined by the Institute of Electrical and Electronics Engineering (IEEE), such as the IEEE 802.11 standard, the IEEE 802.15 standard (e.g., 802.15.4), etc. In one example, the modulation technique and/or data rate are selected from the following non-exhaustive list:

- Frequency Shift Keying (FSK) modulation with a data rate of 50 or 150 kbps; channel spacing of 200 or 400 kHz; and/or a first channel starting at 902.2 or 902.4 MHz. FSK modulation may utilize convolutional code forward error correction (FEC).
- Orthogonal Frequency-Division Multiplexing (OFDM) with physical modulations of binary phase-shift keying (BPSK), quadrature phase-shift keying (QPSK), and/or quadrature amplitude modulation (QAM) (e.g., 16-QAM); a data rate of 50, 100, 200, 300, 400, 600, or 800 kbps; and/or channel spacing of 400 or 800 kHz. OFDM may utilize convolutional FEC with ½ or ¾ coding rate.
- Direct-sequence spread spectrum (DSSS) modulation with a physical modulation of offset quadrature phase-shift keying (O-QPSK); a data rate of 31.25, 125, 250, or 500 kbps; and/or channel design based on a previously defined standard, such as the 802.15.4 standard. DSSS may utilize convolutional FEC.

In further examples, the radio 108 may utilize a customized modulation technique. The customized modulation technique may be associated with a data rate of 6 or 10 kbps.

Meanwhile, the memory 114 may include a communication module 206 configured to cause data to be received and/or sent (e.g., transmitted) over a communication path (e.g., wireless connection). For example, the communication module 206 may cause a communication packet to be received at the node 102B and/or sent from the node 102B. In some instances, the communication module 206 may cause the radio 108 to tune from a frequency associated with a particular channel to another frequency associated with another channel.

The memory 114 may also include a segmentation module 208 configured to segment data. For example, the segmentation module 208 may segment payload data that has been concatenated by the concatenation module 118. In some instances, data is segmented by the segmentation module 208 based at least in part on a modulation technique and/or data rate associated with one or more of the nodes 102. For example, the node 102B may wish to send concatenated payload data to the node 102A. Here, when a data rate supported by the nodes 102A and 102B is greater than a predetermined data rate, the concatenated payload data may be segmented into payloads that each has more than a predetermined number of bits and/or bytes.

In some instances, the memory 114 also includes a metrology module 210 configured to collect consumption data of one or more resources (e.g., electricity, water, natural gas, etc.). The consumption data may include, for example, electricity consumption data, water consumption data, and/or natural gas consumption data. The consumption data may include data generated at the node 102B, another node (e.g., the node 102C and/or 102N), or a combination thereof. The collected consumption data may be transmitted to one or more other nodes 102 for eventual propagation to the central office 104 or another destination.

Further, in some instances the memory 114 includes an encryption/decryption module 212 configured to encrypt and/or decrypt data. For example, the encryption/decryption module 212 may encrypt and/or decrypt payload data from one or more communication packets. In some examples, first and/or second payload data may be decrypted, combined, reencrypted, and sent to another node. The encryption/decryption module 212 may utilize and/or generate encryption/decryption keys.

Example Communication Packet Conversion

Figure 3:
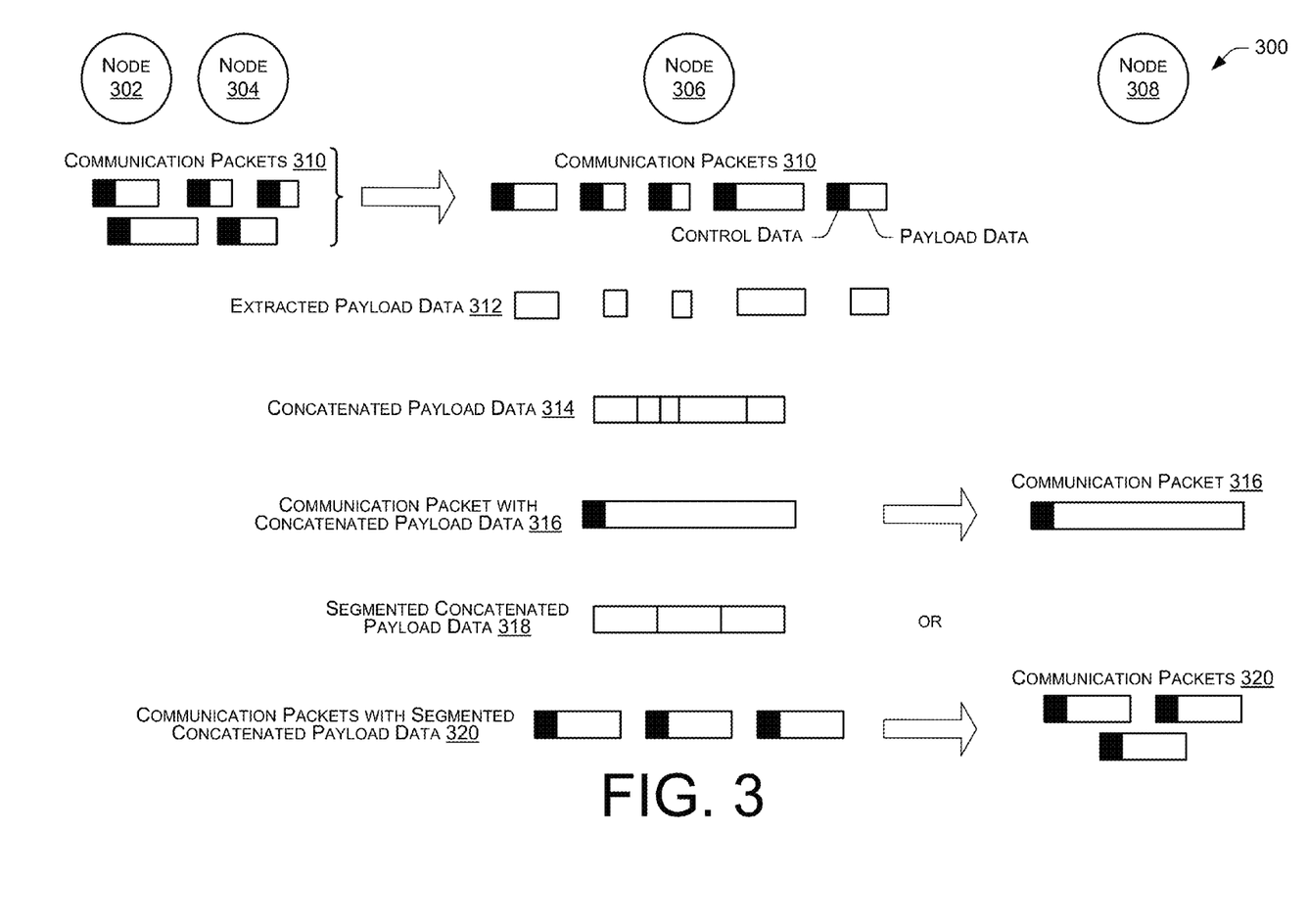
FIG. 3 illustrates an example process of converting communication packets as data within the communication packets traverses one or more nodes of a network.

FIG. 3 illustrates an example process 300 of converting communication packets as data within the communication packets traverses one or more nodes of a network. Here, nodes 302-308 are configured to communicate in a wireless network and may be similar to the nodes 102 in FIG. 1. The nodes 302-308 may be located within a predetermined distance to each other such that at least some of the nodes 302-308 may communicate.

As illustrated, the node 306 may receive communication packets 310 from the nodes 302 and/or 304. The communication packets 310 may be received over one or more wireless connections over a period of time. In some instances, the communication packets 310 are received from one of the nodes 302 and 304, while in other instances at least one communication packet is received from each of the nodes 302 and 304.

The communication packets 310 may vary in size (e.g., number of bits) and/or include fragmented data (e.g., payload data includes a portion of the data). This may occur for various reasons including, for example, differing modulation techniques and/or data rates supported by nodes of a network, differing distances between the nodes, differing uses for payload data included in the communication packets 310, and so on.

In some instances, payload data of a communication packet may include a relatively small amount of data in comparison to control data of the communication packet. That is, the payload data may include less bits and/or bytes than the control data. This may result from relatively small amounts of information that are transmitted periodically (e.g., small in comparison to control information). For example, meter consumption data may be generated and transmitted from a particular node at a regular interval.

At the node 306, payload data of each of the communication packets 310 may be extracted. This may include removing control data from each of the communication packets 310. Extracted payload data 312 may be stored in memory of the node 306. In some instances, the node 306 extracts and stores payload data as each of the communication packets 310 is received.

In some implementations, the extracted payload data 312 is stored for a time period. In some instances, the time period is predetermined, while in other instances the time period is not previously determined (e.g., the time period may be determined on the fly based on conditions such as network traffic). The time period may comprise a contention window, multiple contention windows, or portions of one or more contention windows, for example. In some instances, the contention window is associated with the node 306, while in other instances the contention window is associated with the nodes 302, 304, and/or 308, while in still other instances all or portions of contention windows associated with nodes 302, 304, 306, and/or 308 may be used separately or in combination to define the time period during which payload data is stored.

As used herein, a "contention window" refers to a period of time during which a node waits to transmit, upon cessation of RF signals on a particular channel, before transmitting. In some instances, different nodes have contention windows of different lengths. The contention windows provide a "staggered start," wherein one node is permitted to start RF transmission before other nodes, thereby forcing the other nodes waiting to transmit to suspend a timeout calculation of their own contention windows. Accordingly, contention windows are part of a collision avoidance system in wireless networks.

Alternatively, or additionally, the time period may comprise a time period reserved for communication on a network (e.g., a predetermined communication time period). For example, the time period may comprise a particular time period that is reserved for communication (e.g., transmitting a communication packet) between the node 302 and the node 306 and/or between the node 304 and the node 306. Here, the reserved time period may be communicated to neighboring nodes (e.g., nodes within communication range) before the nodes 302 and/or 304 communicate (e.g., transmit a communication packet). Moreover, in some instances the time period is specified by a network management system and/or a user associated with the network.

In some instances, a node may store extracted payload data for a time period (e.g., predetermined time period) based on information in a communication packet. For example, a particular node may receive a first communication packet indicating that payload data includes a portion of segmented data located at another node. Here, the first communication packet may also indicate that a second communication packet will be transmitted with the remaining segmented data from the other node. This information may be indicated in control data and/or payload data of the first communication packet. Knowing that an entirety of the segmented data has not been received, the particular node may store the payload data of the first communication packet for a time period, such as a period reserved for communication between the particular node and the other node. During the time period, the particular node may receive the second communication packet that includes the remaining segmented data. As discussed in further detail below, this may allow the node to wait to transmit data until an entirety of the data has been received.

Meanwhile, in other instances a node may have been previously configured to store extracted payload data for a time period (e.g., predetermined time period). For example, a user associated with a network of the node may configure the node to automatically store extracted payload data for a particular time period.

After receiving at least some of the communication packets 310, the node 306 may determine whether to concatenate (e.g., combine) extracted payload data. The determination may be based on a destination of extracted payload data, a modulation technique and/or data rate supported by one or more nodes, and/or an application or application type associated with extracted payload data.

For instance, the node 306 may determine to concatenate first and second extracted payload data when the first and second extracted payload data are to be sent to a same geographical region. For example, when a destination address associated with the first extracted payload data and destination address associated with the second extracted payload data identify a same node or nodes within a predetermined distance of each other, the node 306 may determine that the first and second extracted payload data are to be sent to a same geographical region and may determine to concatenate the first and second extracted payload data. Here, the first and second extracted payload data may have been extracted from communication packets transmitted from a same node or different nodes. The node 306 may determine a destination address of payload data based on address information included in a communication packet, such as address information in control data.

Further, in some instances the node 306 may determine to concatenate first extracted payload data with second extracted payload data when the node 306 and/or the node 308 support a particular modulation technique and/or data rate. For example, when a node that will transmit concatenated payload data (e.g., the node 306) and/or a node that will receive the concatenated payload data (e.g., the node 308) support a data rate that is greater than or equal to a data rate at which a communication packet was received, then it may be determined to concatenate the first and second extracted payload data. In some instances, a higher data rate may allow a larger communication packet to be transmitted in comparison to a lower data rate.

Alternatively, or additionally, the node 306 may determine to concatenate first extracted payload data with second extracted payload data when the first and second extracted payload data are associated with a same or similar application or application type. For instance, the first and second extracted payload data may be associated with an application configured to generate a particular type of information.

To illustrate, a metrology application may be configured on the node 302 to retrieve meter consumption data (e.g., a meter reading) of the node 302 and report the meter consumption data to a central office. In reporting to the central office, the meter consumption data may be transmitted to the node 306 as payload data in a communication packet. Meanwhile, a same metrology application on the node 304 may transmit meter consumption data of the node 304 to the node 306 as payload data in a communication packet. The node 306 may determine to concatenate the payload data received from the node 302 and payload data received from the node 304, where the payload data originated from a same application (e.g., metrology application). This may allow data of a similar type and/or data that is to be sent to a similar location (e.g., the central office) to be combined and transmitted.

When it is determined to concatenate extracted payload data, the node 306 may concatenate (e.g., combine) the extracted payload data. In FIG. 3, the node 306 has determined to concatenate the extracted payload data 312 to form concatenated payload data 314. By concatenating payload data, the payload data may be converted as the payload data traverses nodes of a network.

In some embodiments, the concatenated payload data 314 is transmitted to the node 308 without segmentation. The concatenated payload data 314 may be transmitted in a communication packet 316. For example, when a size of the concatenated payload data 314 falls within a particular range of bits and/or bytes, the concatenated payload data 314 may be transmitted to the node 308. The particular range of bits and/or bytes may be based on a modulation technique and/or data rate supported by the nodes 306 and 308. In some instances, a particular modulation technique and/or data rate may be better suited (e.g., based on a signal-to-noise ratio, etc.) for a particular communication packet size in comparison to another modulation technique and/or data rate.

In some instances, the communication packet 316 is transmitted at a data rate that is greater than or equal to a data rate at which at least one of the communication packets 310 was received at the node 306. The data rate associated with transmitting the communication packet 316 may be a data rate that is supported by the node 306 and the node 308. By doing so, a communication time for transmitting payload data may be reduced.

Meanwhile, in other embodiments the concatenated payload data 314 is transmitted to the node 308 after the concatenated payload data 314 is segmented (e.g., divided). The segmentation may be based on a modulation technique and/or data rate that is supported by the particular node that will send the concatenated payload data (e.g., the node 306) and/or a node that will receive the concatenated payload data (e.g., the node 308). In FIG. 3, segmented concatenated payload data 318 represents the concatenated payload data 314 that has been segmented by the node 306.

To illustrate, when it is determined that a data rate supported by the nodes 306 and 308 is greater than or equal to a predetermined data rate, the concatenated payload data 314 may be segmented into payloads that each have more than or equal to a predetermined number of bits and/or bytes. Alternatively, when it is determined that a data rate supported by the nodes 306 and 308 is less than the predetermined data rate, the concatenated payload data 314 may be segmented into payloads that each have less than the predetermined number of bits and/or bytes. By doing so, concatenated payload data may be further converted as the payload data traverses nodes of a network.

In embodiments where concatenated payload data is segmented, the segments may be transmitted individually to one or more nodes. Here, each segment is transmitted in a communication packet that includes control data. In FIG. 3, the segmented concatenated payload data 318 is transmitted to the node 308 in individual communication packets, as illustrated by communication packets with segmented concatenated payload data 320. Each individual communication packet may be transmitted based on a modulation technique and/or data rate that is supported by the nodes 306 and 308 and/or that was the basis for segmenting concatenated payload data. In some instances, by transmitting communication packets with segmented payload data, a node may transmit at a lower data rate than a data rate at which the node received at least some of the payload data. A lower data rate may allow the node to avoid interference and/or transmit a communication packet a longer distance.

The node 306 may send (e.g., transmit) the communication packet 316 or the communication packets 320 after a time period has expired (e.g., predetermined time period). For example, the communication packet 316 or the communication packets 320 may be sent after a time period has expired since one of the communication packets 310 was received, after a time period reserved for communication between the nodes 302 and/or 304 and the node 306 has expired, and/or after a time period utilized for storing extracted payload data has expired. By sending a communication packet after a time period has expired, a node may wait to see if further data will be transmitted to the node that may be combined and transmitted.

In some instances, data (e.g., payload data) is encrypted and/or decrypted during conversion of one or more communication packets. For example, if one or more of the communication packets, or data within the communication packets, are received at a particular node in an encrypted format, the particular node may decrypt the encrypted data (e.g., encrypted payload data). The particular node may then concatenate and/or segment the data. In some instances, concatenated and/or segmented data is encrypted and sent to another node, while in other instances the concatenated and/or segmented data is sent without being encrypted.

Further, in some instances data (e.g., payload data) may be maintained in an encrypted format during conversion of one or more communication packets. For example, when encrypted data is to be sent through a network of nodes, a communication packet may be utilized with unencrypted control data and encrypted payload data. Because the control data is not encrypted, a node may utilize the control data to determine whether to combine the payload data (e.g., the encrypted data) with other payload data and forward combined payload data on to another node. For example, the node may utilize address information included in the control data to determine a destination of the encrypted data. As such, in some instances the techniques described herein may be leveraged without decrypting encrypted data, thereby maintaining the security of the data as the data traverses the network.

As noted above, the conversion techniques described herein may allow data to be transmitted in an efficient manner. For example, by combining payload data that is to be sent to a same or similar location and transmitting the combined payload data, less overhead data (e.g., control data) may be utilized to transmit the data in comparison to transmitting the payloads individually. This may reduce communication time and increase communication capacity of a network.

Further, by utilizing a modulation technique and/or data rate supported by nodes of a network to combine and/or segment payload data, the network may leverage capabilities of the nodes. This may potentially allow data (e.g., payload data) to be transmitted at a higher data rate than the data may otherwise have been transmitted. For instance, when a data rate of a communication path (e.g., wireless connection) utilized to forward on payload data from a node is greater than a data rate of a communication path utilized to receive the payload data at the node, then the payload data may be combined with other payload data and transmitted from the node at a higher data rate.

Additionally, in some instances the conversion techniques described herein may be leveraged for encrypted data. In some examples, payload data that is received in an encrypted format may be maintained in an encrypted format while other payload data is combined with encrypted payload data and the combined payload data is segmented and/or sent to another node. This may maintain the security of the encrypted payload data as the data traverses nodes of a network. Alternatively, or additionally, payload data that is received in an encrypted format may be decrypted, combined, segmented, and/or sent to a node. This may provide further security to the payload data.

Example Protocol Data Unit (PDU)

Figure 4:
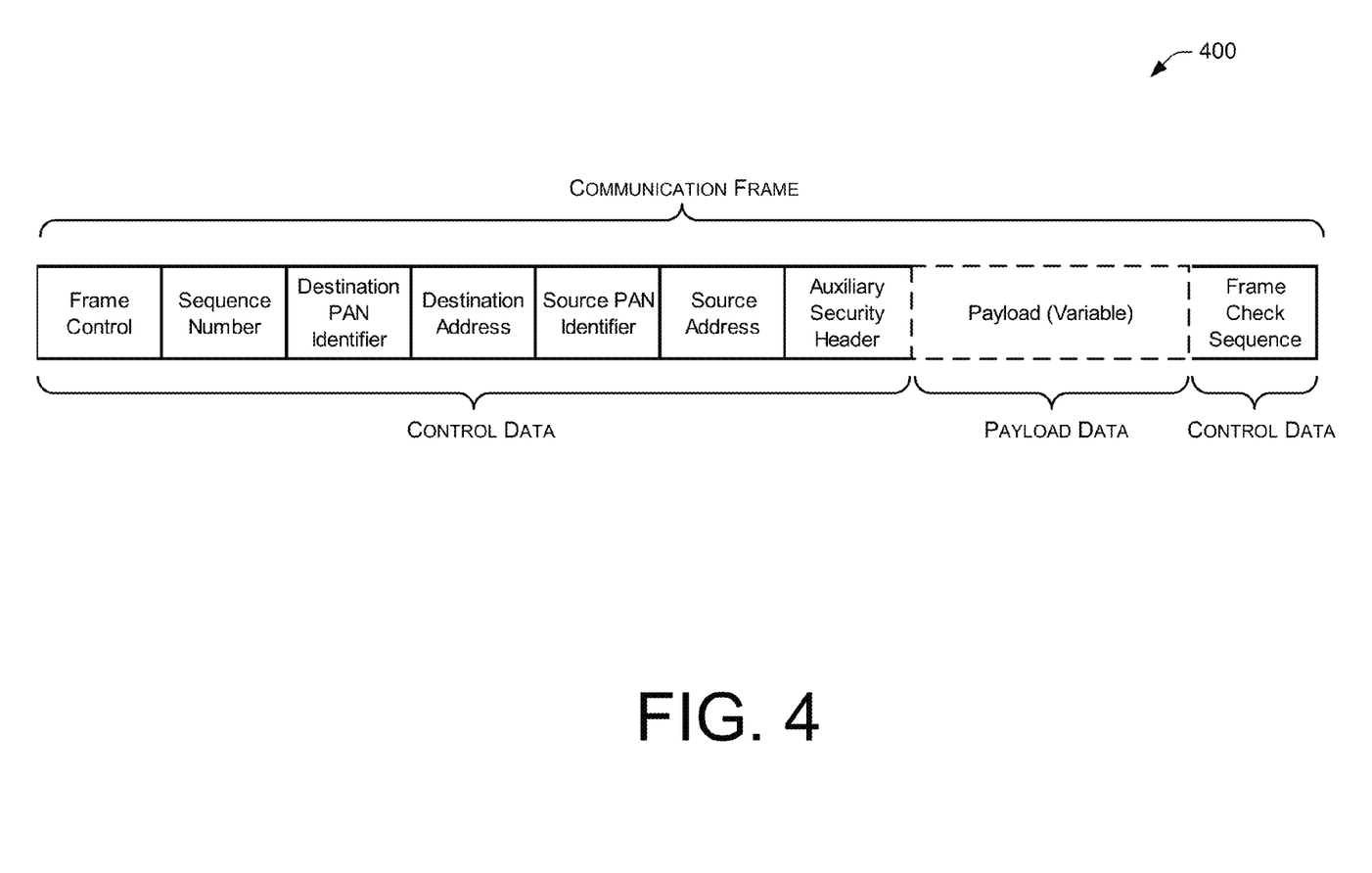
FIG. 4 illustrates an example communication frame that may be used to communicate payload data over a network.

FIG. 4 illustrates an example protocol data unit which may be utilized to transmit payload data. The term PDU is used herein to generally refer to any communication, message, or transmission within a communication network, such as that shown in FIG. 1. The term PDU is based, at least in concept, on the Open Systems Interconnection (OSI) Model and may comprise, for example, a bit, a frame, a packet, a segment, etc. In some instances, one or more layers of the OSI model may be utilized to transfer one or more PDUs between nodes. For example, the data link layer of the OSI model may be utilized to transfer PDUs between two or more of the nodes 102 in the architecture 100. In particular implementations, the media access control (MAC) sub-layer of the data link layer may be utilized to transfer PDUs between two or more of the nodes 102.

FIG. 4 illustrates an example communication frame 400 that may used to transmit payload data to one or more nodes. In this example, the communication frame structure is defined, at least in part, by the IEEE 802.15.4 standard. However, in other examples other PDU structures may be used for transmitting payload data. As shown in FIG. 4, the communication frame 400 may include the following fields: frame control, sequence number, destination personal area network (PAN) identifier, destination address, source PAN identifier, source address, auxiliary security header, payload, and frame check sequence (FCS). Details of the foregoing fields of the communication frame are well known to those skilled in the art and are not described in detail herein.

In the example communication frame 400, the frame control, sequence number, destination PAN identifier, destination address, source PAN identifier, source address, auxiliary security header, and frame check sequence (FCS) include control data. In some instances, the frame control, sequence number, destination PAN identifier, destination address, source PAN identifier, source address, auxiliary security header represent a header, while the frame check sequence represents a footer. Meanwhile, the payload includes payload data that may be variable in size based on a size of data to be included in the communication frame 400.

Example Process

Figure 5A:
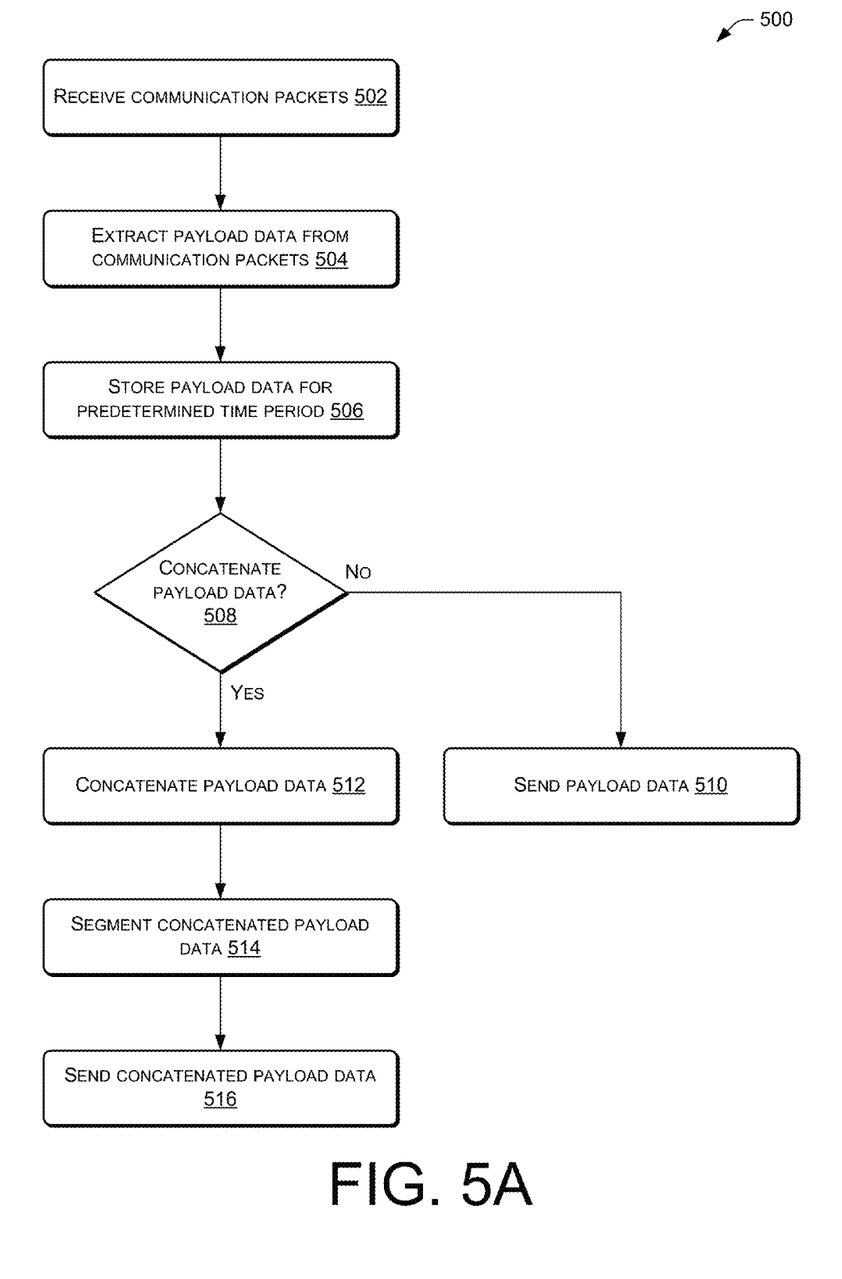
FIGS. 5A-5B illustrate an example process for extracting payload data from communication packets, determining whether to concatenate the extracted payload data, concatenating the extracted payload data, and sending the concatenated payload data in a communication packet.
Figure 5B:
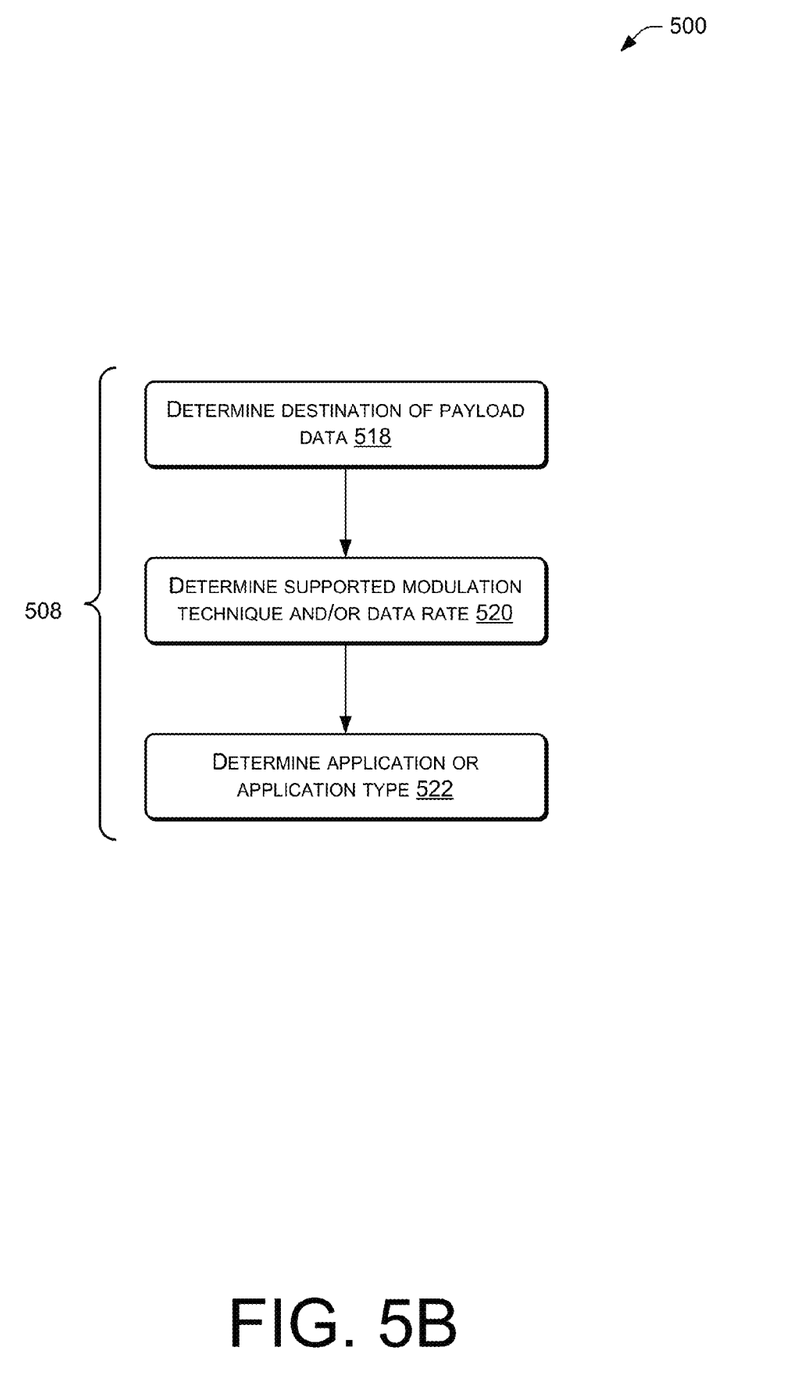

FIGS. 5A-5B illustrate an example process 500 for extracting payload data from communication packets, determining whether to concatenate the extracted payload data, concatenating extracted payload data, and sending the concatenated payload data. For ease of illustration process 500 is described as being performed in the architecture 100 of FIG. 1. For example, one or more of the individual operations of the process 500 may be performed by any of the nodes 102 in the architecture 100, such as the node 102B. However, process 500 may be performed in other systems and/or using other components.

The process 500 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In FIG. 5A, at operation 502 a node receives communication packets from one or more neighboring nodes (e.g., nodes within communication range to the node). Each communication packet may include control data and payload data. At operation 504, the node extracts payload data from each of the received communication packets.

At operation 506, the node stores the extracted payload data in memory of the node for a period of time (e.g., predetermined time period). The period of time may comprise a contention window, a time period reserved by a node for communication on a network, and so on. In some instances, the time period is specified by a network management system and/or a user associated with the network.

In some examples, the operations 502-506 are performed as each communication packet is received. That is, a node may receive a particular communication packet, extract payload data from the communication packet, and store the extracted payload data to memory for a time period (e.g., predetermined time period). In other instances, the operations 502-506 may be performed on a plurality of communication packets.

At operation 508, a node may determine whether to concatenate (e.g., combine) extracted payload data. For example, the node may determine whether to combine payload data that has been extracted in the operation 504. The operation 508 may include performing one or more operations to determine whether to concatenate extracted payload data. These operations are illustrated in FIG. 5B and will be discussed in further detail below.

When the operation 508 determines to not concatenate payload data, an operation 510 may be performed. At the operation 510, a node may send the payload data to another node. In some instances, the payload data is sent in the same form in which it was received at the node. That is, payload data received in a single communication packet will be sent in a single communication packet without combining and/or segmenting the payload data with other payload data. When the operation 508 determines to concatenate payload data, an operation 512 may be performed. At the operation 512, a node may concatenate (e.g., combine) extracted payload data. For example, the node may concatenate two or more extracted payloads based on a determination at the operation 508 to concatenate the two or more extracted payloads. The concatenated payloads may form continuous data.

In some instances, the process 500 includes an operation 514. At the operation 514, a node segments concatenated payload data. That is, the concatenated payload data may be divided into multiple segments. The operation 514 may be performed based on a modulation technique and/or data rate supported by a node that will send the segments and/or a node that will receive the segments.

At operation 516, a node may send (e.g., transmit) concatenated payload data to one or more neighboring nodes. In some instances, the segmented concatenated payload data of the operation 514 is sent as multiple communication packets, while in other instances the concatenated payload data of the operation 512 is sent in a single communication packet. Further, in some instances the concatenated payload data is sent after a time period (e.g., predetermined time period) has expired. The time period may correspond to the time period during which extracted payload data is stored in the operation 506.

FIG. 5B illustrates example operations 518-522 that may be performed to determine whether to concatenate payload data at the operation 508. Any one or a combination of the operations 518-522 may be performed at the operation 508 in any order. At operation 518, the node may determine a destination of extracted payload data. This determination may be based on destination addresses included in control data associated with extracted payload data. For instance, when first extracted payload and second extracted payload data are to be sent to a same node or nodes within a predetermined distance of each other (e.g., same geographical region), the operation 508 may determine to concatenate the first and second extracted payload data.

At operation 520, the node may determine a modulation technique and/or data rate supported by a node that received the communication packets and a node to which concatenated extracted payload data will be sent. When the modulation technique and/or data rate are a particular modulation technique and/or data rate (e.g., a data rate greater than a data rate at which a communication packet was received), the operation 508 may determine to concatenate extracted payload data.

At operation 522, the node may determine an application or application type associated with extracted payload data. When an application or application type is the same or similar for extracted payloads, the operation 508 may determine to concatenate the extracted payloads.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. One or more devices comprising:
one or more processors; and
memory storing executable instructions that, when executed by the one or more processors, cause the one or more processors to perform acts including:
receiving a first communication packet from a first utility node and a second communication packet from a second utility node, each of the first and second communication packets comprising control data and payload data, the control data for controlling sending and/or receiving of the payload data, the first utility node and the second utility node being part of a mesh network;
extracting the payload data from the first communication packet and the payload data from the second communication packet;
determining that the extracted payload data of the first communication packet and the extracted payload data of the second communication packet each include consumption data, the consumption data including at least one of electricity consumption data, water consumption data, or natural gas consumption data;
concatenating the extracted payload data of the first communication packet and the extracted payload data of the second communication packet based at least in part on the determining;
determining that a data rate supported by the one or more devices and a third utility node of the mesh network to which the concatenated payload data is to be transmitted is less than a predetermined data rate;
segmenting the concatenated payload data into segmented payload data based at least in part on determining that the data rate supported by the one or more devices and the third utility node is less than the predetermined data rate; and
transmitting the segmented payload data in a communication packet to the third utility node, wherein the transmitting includes transmitting segments of the segmented payload data individually.

2. The one or more devices of claim 1, wherein the one or more devices comprise one or more control devices, one or more sensors, one or more transformers, one or more routers, one or more servers, one or more relays, one or more switches, and/or one or more valves.

3. The one or more devices of claim 1, wherein the one or more devices are associated with one or more utility meters.

4. The one or more devices of claim 1,
wherein the acts further include storing, in the memory, the extracted payload data of the first communication packet and the extracted payload data of the second communication packet for at least one of (i) a period of time reserved for receiving at least one of the first communication packet or the second communication packet or (ii) a contention window defining a period of time during which the one or more devices wait to communicate.

5. The one or more devices of claim 1, wherein the segmenting is further based on at least one of a modulation technique or a data rate that is supported by the one or more devices and the third utility node.

6. A method under control of a first node of a wireless network, the method comprising:
receiving a first communication packet from a second node of the wireless network and a second communication packet from a third node of the wireless network, the first and second communication packets each comprising control data and payload data;
extracting the payload data from the first communication packet and the payload data from the second communication packet;
determining that the payload data of the first communication packet and the payload data of the second communication packet each include consumption data of a resource;
in response to determining that the payload data of the first communication packet and the payload data of the second communication packet each include consumption data of the resource, combining the payload data of the first communication packet with the payload data of the second communication packet to form combined payload data;
determining that a data rate supported by the first node and a fourth node to which the combined payload data is to be transmitted is less than a predetermined data rate;
segmenting the combined payload data into segmented payload data based at least in part on determining that the data rate supported by the first node and the fourth node is less than the predetermined data rate; and
wirelessly transmitting the combined payload data to a fourth node of the wireless network, wherein the wirelessly transmitting includes wirelessly transmitting segments of the segmented payload data individually.

7. The method of claim 6, further comprising:
determining that the payload data of the first communication packet and the payload data of the second communication packet are to be transmitted to a same node or nodes within a predetermined distance of each other;
wherein the payload data of the first communication packet and the payload data of the second communication packet are combined based at least in part on determining that the payload data of the first communication packet and the payload data of the second communication packet are to be transmitted to the same node or nodes within the predetermined distance of each other.

8. The method of claim 6, further comprising:
determining that a data rate at which the combined payload data is to be transmitted is greater than or equal to a data rate at which the first communication packet or the second communication packet is received; and
wherein the payload data of the first communication packet and the payload data of the second communication packet are combined based at least in part on determining that the data rate at which the combined data is to be transmitted is greater than or equal to the data rate at which the first communication packet or the second communication packet is received.

9. The method of claim 6, wherein:
the receiving includes receiving at least one of the first communication packet or the second communication packet at a first data rate via a wireless connection; and
the wirelessly transmitting includes wirelessly transmitting the combined payload data at a second data rate via another wireless connection, the second data rate being greater than or equal to the first data rate.

10. The method of claim 6,
wherein the segmenting is further based at least in part on a modulation technique that is supported by the first node and the fourth node; and wherein the wirelessly transmitting includes wirelessly transmitting the segments of the segmented payload data individually based at least in part on the modulation technique.

11. The method of claim 6, further comprising:
receiving a third communication packet, the third communication packet indicating that a fourth communication packet will be sent, the third communication packet including a first portion of consumption data;
receiving the fourth communication packet during a period of time reserved for communication of the fourth communication packet, the fourth communication packet including a second portion of the consumption data;
combining payload data of the third communication packet with payload data of the fourth communication packet to form additional combined payload data; and
transmitting the additional combined payload data.

12. The method of claim 6, wherein the wirelessly transmitting includes wirelessly transmitting the combined payload data after a predetermined time period has expired since at least one of the first communication packet or the second communication packet was received.

13. One or more non-transitory computer-readable storage media storing executable instructions that, when executed by one or more processors, cause the one or more processors to perform the method of claim 6.

14. One or more non-transitory computer-readable storage media storing executable instructions that, when executed by one or more processors, cause the one or more processors to perform operations comprising:
receiving a first communication packet and a second communication packet at a first node from at least one second node, the first and second nodes being nodes of a plurality of nodes of a mesh network, the first and second communication packets each comprising control data and payload data, each of the nodes of the mesh network being associated with a utility meter;
extracting the payload data from the first communication packet and the payload data from the second communication packet;
determining that the payload data of the first communication packet and the payload data of the second communication packet each include resource consumption data;
concatenating the payload data of the first communication packet with the payload data of the second communication packet based at least in part on determining that the payload data of the first communication packet and the payload data of the second communication packet each include resource consumption data;
determining that a data rate supported by the first node and a third node of the plurality of nodes to which the concatenated payload data is to be transmitted is less than a predetermined data rate;
segmenting the concatenated payload data into segmented payload data based at least in part on determining that the data rate supported by the first node and the third node is less than the predetermined data rate; and
wirelessly transmitting the segmented payload data to the third node, wherein the wirelessly transmitting includes wirelessly transmitting segments of the segmented payload data individually.

15. The one or more non-transitory computer-readable storage media of claim 14, wherein the
segmenting is further based at least in part on a modulation technique that is supported by the first node and at least one other of the plurality of nodes.

16. The one or more non-transitory computer-readable storage media of claim 14, wherein the operations further comprise:
determining that the payload data of the first communication packet and the payload data of the second communication packet are to be transmitted to a same node or nodes within a predetermined distance of each other;
wherein the payload data of the first communication packet and the payload data of the second communication packet are concatenated based at least in part on determining that the payload data of the first communication packet and the payload data of the second communication packet are to be transmitted to the same node or nodes within the predetermined distance of each other.

17. The one or more non-transitory computer-readable storage media of claim 14, wherein the operations further comprise:
determining that a data rate at which the concatenated payload data is to be transmitted is greater than or equal to a data rate at which the first communication packet or the second communication packet is received;
wherein the payload data of the first communication packet and the payload data of the second communication packet are concatenated based at least in part on determining that the data rate at which the concatenated payload data is to be transmitted is greater than or equal to the data rate at which the first communication packet or the second communication packet is received.

18. A method under control of a first node of a wireless network, the method comprising:
receiving a first communication packet from a second node of the wireless network and a second communication packet from a third node of the wireless network, the first and second communication packets each comprising control data and payload data;
extracting the payload data from the first communication packet and the payload data from the second communication packet;
determining that the payload data of the first communication packet and the payload data of the second communication packet each include consumption data of a resource;
in response to determining that the payload data of the first communication packet and the payload data of the second communication packet each include consumption data of the resource, combining the payload data of the first communication packet with the payload data of the second communication packet to form combined payload data;
wirelessly transmitting the combined payload data to a fourth node of the wireless network;
receiving a third communication packet, the third communication packet indicating that a fourth communication packet will be sent, the third communication packet including a first portion of consumption data;
receiving the fourth communication packet during a period of time reserved for communication of the fourth communication packet, the fourth communication packet including a second portion of the consumption data;
combining payload data of the third communication packet with payload data of the fourth communication packet to form additional combined payload data; and
transmitting the additional combined payload data.

* * * * *